(12) United States Patent
Duval et al.

(10) Patent No.: US 8,636,151 B2
(45) Date of Patent: Jan. 28, 2014

(54) METHOD OF PREVENTING FILTER MEDIA CRACKING WHEN COMPRESSING TWO OR MORE FILTER MEDIA LAYERS

(75) Inventors: Neal M. Duval, Manchester, CT (US); Gokhan Kuruc, Meriden, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 1005 days.

(21) Appl. No.: 12/441,162

(22) PCT Filed: Sep. 19, 2007

(86) PCT No.: PCT/US2007/078826
§ 371 (c)(1),
(2), (4) Date: Oct. 20, 2009

(87) PCT Pub. No.: WO2008/036699
PCT Pub. Date: Mar. 27, 2008

(65) Prior Publication Data
US 2010/0044299 A1 Feb. 25, 2010

Related U.S. Application Data

(60) Provisional application No. 60/826,549, filed on Sep. 22, 2006.

(51) Int. Cl.
| | | |
|---|---|---|
| *B01D 27/07* | (2006.01) | |
| *B01D 27/08* | (2006.01) | |
| *B29C 45/14* | (2006.01) | |
| *B01D 25/26* | (2006.01) | |
| *B01D 25/00* | (2006.01) | |

(52) U.S. Cl.
CPC .............. *B01D 25/26* (2013.01); *B01D 25/001* (2013.01)
USPC .......................................... 210/436; 264/229

(58) Field of Classification Search
CPC ...... B01D 29/012; B01D 29/05; B01D 25/26; B01D 25/001
USPC .................................... 210/436, 335; 264/229
See application file for complete search history.

(56) References Cited

U.S. PATENT DOCUMENTS 3,782,083 A * 1/1974 Rosenberg ...................... 55/491
3,909,019 A * 9/1975 Leko .............................. 277/649

(Continued)

FOREIGN PATENT DOCUMENTS

DE 23 54 269 5/1975
DE 42 19 966 1/1993

(Continued)

OTHER PUBLICATIONS

European Extended Search Report, Nov. 30, 2009.

*Primary Examiner* — Bobby Ramdhanie
*Assistant Examiner* — Denise R Anderson
(74) *Attorney, Agent, or Firm* — Scott A. Baum

(57) ABSTRACT

The present disclosure generally relates to injection molded thermoplastic single filter media layer and multi-filter media layer filter cartridges that include a novel arrangement of structural features to improve both the quality of the manufacturing process and the integrity of the filter media layer seal and more particularly to a process for manufacturing both single filter media layer and multi-filter media layer filter cartridges and to the single filter media layer and the multi-filter media layer filter cartridges produced thereby and even more particularly to a process for manufacturing a multi-filter media layer filter cartridge without cracking the upper most filter media layer or any filter media layer during the compressing of at least two porous filter media layers between an inlet and an outlet while insuring an effective seal and the multi-filter media layer filter cartridges produced thereby and, yet, more particularly, to single filter media layer and the multi-filter media layer filter cartridges using only a single inlet design configuration and a single outlet design configuration for manufacturing a plurality of different single filter media layer filter cartridge configurations and a plurality of different multi-filter media layer filter cartridge configurations.

13 Claims, 5 Drawing Sheets

(56) References Cited

U.S. PATENT DOCUMENTS

| | | |
|---|---|---|
| 4,007,113 A | 2/1977 | Ostreicher |
| 4,113,627 A | 9/1978 | Leason |
| 4,366,068 A | 12/1982 | Ostreicher |
| 4,414,172 A | 11/1983 | Leason |
| 4,606,824 A | 8/1986 | Chu et al. |
| 4,859,340 A | 8/1989 | Hou et al. |
| 5,004,542 A * | 4/1991 | Lyons et al. ............. 210/356 |
| 5,055,192 A | 10/1991 | Artinyan et al. |
| 5,472,605 A * | 12/1995 | Zuk, Jr. ............. 210/436 |
| 5,556,641 A | 9/1996 | Lambridis et al. |
| 5,601,711 A * | 2/1997 | Sklar et al. ............. 210/238 |
| 5,688,460 A | 11/1997 | Ruschke |
| 5,798,041 A | 8/1998 | Zuk, Jr. |
| 6,274,055 B1 | 8/2001 | Zuk, Jr. |

FOREIGN PATENT DOCUMENTS

| | | |
|---|---|---|
| EP | 0788824 | 8/1997 |
| EP | 1 016 433 B1 | 11/2003 |

\* cited by examiner

METHOD OF PREVENTING FILTER MEDIA CRACKING WHEN COMPRESSING TWO OR MORE FILTER MEDIA LAYERS

CROSS REFERENCE TO RELATED APPLICATIONS

This application is a national stage filing under 35 U.S.C. 371 of PCT/US2007/078826, filed Sep. 19, 2007, which claims priority to Provisional Application No. 60/826,549, filed Sep. 22, 2006, the disclosure of which is incorporated by reference in its/their entirety herein.

BACKGROUND

The present disclosure generally relates to injection molded thermoplastic single filter media layer and multi-filter media layer filter cartridges that include a novel arrangement of structural features to improve both the quality of the manufacturing process and the integrity of the filter media layer seal and more particularly to a process for manufacturing both single filter media layer and multi-filter media layer filter cartridges and to the single filter media layer and the multi-filter media layer filter cartridges produced thereby and even more particularly to a process for manufacturing a multi-filter media layer filter cartridge without cracking the upper most filter media layer or any filter media layer during the compressing of at least two porous filter media layers between an inlet and an outlet while insuring an effective seal and the multi-filter media layer filter cartridges produced thereby and, yet, more particularly, to single filter media layer and the multi-filter media layer filter cartridges using only a single inlet design configuration and a single outlet design configuration for manufacturing a plurality of different single filter media layer filter cartridge configurations and a plurality of different multi-filter media layer filter cartridge configurations.

Molded plastic filters and multi-filter media layer filter cartridges are well known and enjoy a wide use and general acceptance in a variety of industries. As is known to those skilled in the art, the function of such units is to remove contaminants from liquid or gaseous materials, which flow therethrough. These units have proven to be particularly important in the pharmaceutical and biopharmaceutical industry where they are used to filter bacteria, leukocytes, clots, particles, gases and other contaminants from solutions before being introduced into the human blood stream, although they may have other applications including, but not limited to, high purity water or solvents. In certain critical medical applications, it is known to be imperative that the fluid not bypass the filtering media elements. When using depth media that consists of a combination of cellulose and filteraids such as described in U.S. Pat. Nos. 4,007113, 4,366,068, 4,606,824 and 4,859,340, which find particular function where sub-micronic filtration must be achieved, it is important that the seal not damage the media. Owing to its constituents, such media is prone to brittleness, especially if subjected to excessive crimping at the edge. Therefore, it is necessary to provide an undamaged, leak-proof single media layer or a multi-filter media layer filter cartridge to prevent leakage around the filter media layer(s) contained therein.

Typically, smaller filter devices used to filter bioprocess or pharmaceutical solutions are made up of two-part housing with an internally disposed filter media layers sandwiched between the two housing members. Typically, the manufacturing process for thermoplastic filter units entails first the injection molding of the two housing members. Once the housing members have been molded, the filter media layers are usually placed on the outlet-housing member over the outlet opening. The inlet housing element is then positioned over the outlet-housing member sandwiching the filter media layers between the two housing members. In some known prior art devices, the edges of the filter media layers remain exposed at the joint between the housing members. The inlet housing member, outlet housing member and filter media layers are then sealed together by any of a variety of methods including, pressure clamping, heat sealing, ultrasonic welding, or the use of a thermoplastic overmold band, as is known to those skilled in the art. In particular, the use of an overmold band offers the advantage of adding significant structural strength to the multi-filter media layer filter cartridge.

There are a number of prior art patents that have been directed to solving problems in this general area. There are two U.S. patents that generally describe the process of sealing a filter with a thermoplastic overmold band, U.S. Pat. No. 4,113,627, to Leason issued on Sep. 12, 1978 which, describes a process for the injection molding of a thermoplastic overmold band over two thermoplastic housing members having an exposed filter element sandwiched there between and U.S. Pat. No. 4,414,172, to Leason issued on Nov. 8, 1983 which, describes a process for the injection molding of a thermoplastic overmold band over one housing member and an exposed filter element, the disclosure of each is herein incorporated by reference to the extent not inconsistent with the present disclosure.

Several more recent prior art patents include U.S. Pat. No. 5,556,641, to Ruschke entitled Process of Making Hermetically Sealed Filter Units and Filters Made Thereby, issued Sep. 17, 1996 and the divisional U.S. Pat. No. 5,688,460, to Ruschke, entitled Process of Making Hermetically Sealed Filter Units, issued Nov. 18, 1997 which related to a process for the manufacture of intravenous solution filter units includes injection molding a sealing member onto the periphery of the assembled filter components to hermetically seal the components into an integral assembly, the disclosure of each is herein incorporated by reference to the extent not inconsistent with the present disclosure. The filter unit itself includes a housing and a filter element disposed internally thereof. The filter element is supported by a grid having a design and placement within the housing to assure, in conjunction with other structural features of the filter, the complete purging of gases from the filtrate. Also disclosed was a method for hermetically sealing the filter element to its thermoplastic support, which provides an improved seal, which will not leak. The disclosed method comprises the molding of the support, the alignment of the filter element on the support, the application of pressure to hold the element on the support and the overmolding of the periphery of the element to seal the edge of the element to the support.

U.S. Pat. No. 5,798,041, to Zuk, Jr. entitled In-Line Liquid Filtration Device Usable For Blood, Blood Products Or The Like, issued Aug. 25, 1998, which relates to an in-line liquid filtration device useable for filtration of blood, blood products or the like includes a housing having an inlet port, an outlet port, at least one filter element disposed in the housing between the inlet port and outlet port so as to filter liquid which flows into the filtration device via the inlet port, the disclosure of which is herein incorporated by reference to the extent not inconsistent with the present disclosure. The filter element divides the housing into a first chamber and a second chamber. The device allows gases to vent the filtration device through the outlet port. The means may include a flow deflector within the first chamber and/or the second chamber. The means may also include a channel, preferably spiral, within either the first chamber and/or second chamber. The filtration device allows air therein to be purged downstream either into an air-collecting bag or into the blood-receiving bag without the manipulation of the height of the filtration device or the blood-receiving bag.

The seal rings in the existing patent were designed in a stepped fashion and were mounted outside of the filter media. The distance from the internal "stepped" surface to the overall height determined the amount that the filter media would be compressed. In order to achieve a leak proof seal in all of the varying applications, several different seal rings needed to be designed and incorporated due to the several different thicknesses, densities and compression requirements of the filter media.

The seal rings needed to be press fit or otherwise bonded to the outlet in one way or another in order to create a leak proof seal and prevent bypass of fluids from the upstream to the downstream sides. In the existing design, the compression of the filter media and the overmold material form a leak proof seal and prevent bypass of the filtrate.

The above are but a few examples of a multitude of representative prior art patents that are directed to the general subject matter of the present disclosure.

In contrast to Zuk, Jr., the seal described in the present disclosure is not stepped, and is placed within the outside diameter (OD) of the filter media layers. The seal design and placement allows the filter media to be compressed however much is required in order to create a molding seal during the forming of the exterior overmold. As will be described in detail below, compressive forces from the mold cavity and core plates are transferred through the inlet, the outlet, the seal(s) and each piece of filter media, with the amount of compression being adjustable within the mold.

Our initial concept, as illustrated in FIG. 1, was a multi-filter media layer filter cartridge having multiple filter media layers and no seal rings positioned between the multiple filter media layers. However, when tested, this concept usually resulted in unwanted cracking of the upper filter media layer(s) 23. In the multi-filter media layer filter cartridge 20 illustrated, the filter media layers are stacked between an inlet 24 and an outlet 26. All components are then loaded into a mold, compressed between a cavity and core and overmolded with plastic 28 to seal the filter media layers therein. The multi-filter media layer filter cartridge is designed such that when it is compressed between the cavity and core, the filter media layer(s) deform at the perimeter 30 thereof. This compression is done to collapse and close all of the pores of the filter media layer(s) in order to prevent resin from passing through the filter media layers and into the center 32 of the multi-filter media layer filter cartridge. To compensate for varying filter media thicknesses and stack heights, the mold is adjustable to create varying amounts of compression.

FIG. 1 also illustrates the two problems that the seal ring(s) 34 (see FIG. 4) of the present disclosure are designed to resolve. First, as mentioned above, when compressed, two or more stacked filter media layers 22 often crack 36. In the assembly of the multi-filter media layer filter cartridge 20, the first filter media layer 21 is laid flat against the outlet 26. The second 22 and third filter media layers 23 are then laid on top of the first 21. Finally, the inlet 24 is laid on top of the upper most filter media layer 23. During the compression stage of the overmolding process, the bottom filter media layer 21 deforms due to compression at the perimeter 30 thereof. The middle filter media layer 22 deforms due to compression and due to bending caused by the compression. As the multi-filter media layer filter cartridge 20 is compressed in the mold, the middle filter media layer 22 has to first follow the contour of the bottom filter media layer 21 and also has its perimeter 30 compressed. As compression continues, the top filter media layer 23 then is deformed even more than the middle filter media layer 22 as it bends over the increased height of the contour of the middle filter media layer 22 as the perimeter 30 of the top filter media layer 23 is compressed. The stress on each filter media layer increases as the number of filter media layers increases. As a result, the top filter media layer 23 has been found to easily crack 36 and thus, to provide a path for the filtrate to follow without having to pass through the filter media layer pores. Such cracking has been found to not be limited to the uppermost filter media layer 23, as the middle filter media layer 22 and other intermediate filter media layer(s) have also been found to crack and thus reduce the cracked filter media layers effectiveness as well.

Second, it was also determined that in order to support the sealing surface and create a chamber to allow fluid to enter between the top most media layer and the inlet, and reduce hold up volume, different configurations of the inlet part were required to manufacture the embodiment of FIG. 1. Specifically, if only one filter media layer were to be included in the assembly, a relatively short walled inlet configuration would be preferred to reduce hold up volume, as illustrated in FIG. 2. On the other hand, if two or more filter media layers were to be used in the multi-filter media layer filter cartridge assembly a relatively taller walled inlet configuration would be required, as illustrated in FIG. 1. While it may be possible to use a taller walled inlet to make a filter cartridge with a single media layer, this would create un-wanted extra hold up volume, which is undesirable.

However, now it has been determinate that a single inlet design configuration can be utilized with one, two, three or more filter media layers thereby eliminating the need for two or more different inlet design configurations, which results in a significant simplification of the manufacturing process. This was achieved because one filter media layer units required that the inlet have a specific headspace in order to accommodate fluid flow. If an additional filter media layer was added to the first filter media layer, the compression forced both layers further into the head space requiring more head space to sufficiently accommodate fluid flow. However, the spacer element eliminates the need for this additional headroom to be built into the part because it adds the volume only as it is needed. The seal ring is simpler to mold than multiple inlets.

Therefore, a need exists for a manufacturing method, which will eliminate the problem of filter media cracking found in some prior, art methods of manufacturing multi-filter media layer filter cartridges and reduces the number of constituent parts thereby simplifying the manufacturing process for a single filter media layer and multi-filter media layer filter cartridges and the single layer filter media and the multi-filter media layer filter cartridges produced thereby.

SUMMARY

One objective of the present disclosure is to develop improved methods for manufacturing single filter media filter cartridges and/or multi-filter media layer filter cartridges by providing one, two, three or more layers of filter media for incorporation into a filter cartridge, the one, two, three or more layers of filter media then being loaded between an inlet component and an outlet component to form a subassembly, this subassembly is then loaded into an injection mold, compressed and overmolded to integrally seal around the subassembly to form a one, two, three or more filter media layer filter cartridge unit. (See FIGS. 2-3 and 5-6.)

As mentioned above during the development process that led to the present disclosure, it was found that during our initial concept of the filter media cartridge manufacturing process, the large bend radius of the top filter media layer, caused filter media cracking which, in turn, reduced the efficiency and life of the filter media cartridge made thereby. This specific prior art design concept also required the utilization of a different inlet part for single filter media layer cartridges and at least one other inlet part for at least two or more filter media layered filter media cartridges (See FIGS. 2-3 and 5-6).

During the development, process undertaken to overcome the problems experienced with the above prior manufacturing process and filter assemblies resulting therefrom, the concept of adding spacer seals to take up space between adjacent filter media layers, thus creating a more equal bending radius for each of the filter media layers was considered. It was also determined that the need to have more than one different inlet parts was eliminated, thus, allowing for the reduction of the number of components required, particularly, the requirement for only one inlet component as opposed to multiple inlet components of the prior design.

Specifically, in accordance with one representative presently preferred embodiment of the present disclosure, spacer seal(s) is/are positioned between any two filter media layers prior to loading the subassembly into the injection molding equipment. The spacer seal(s) is/are designed to be substantially equal to the difference between the thickness of an uncompressed filter media, and the thickness of the compressed edge of a filter media layer after completion of the overmolding step in the manufacturing process. The outside diameter of the spacer seal(s) is/are designed to be substantially equal to the filter media diameter and inside diameter of the spacer seal(s) is/are designed to be substantially equal to the inner diameter of the inlet. The spacer seal(s) is/are a wetted part, so the spacer seal(s) is/are presently preferably made from the same material or substantially the same material as the inlet and the outlet, as using the same material creates a strong bond for the overmold and the filter cartridge components and in the primary industry of use, component uniformity of material is some times dictated by regulations.

One presently preferred aspect of the present disclosure includes a plastic molded single media filter cartridge comprising: at least one porous filter media layer having an outer periphery, an upper portion and a bottom portion; an inlet having a top and a bottom surface, at least one inlet opening operatively positioned therein, the at least one inlet opening providing a connection for a user for operatively connecting the filter cartridge to a supply liquid and also providing support for the upper most porous filter media layer, a structural component operatively position proximate the outer periphery of the bottom surface of the inlet for operatively interacting with the upper portion of the single filter media layer by increasing the compression on the top filter media layer to ensure that the pores of the single media layer is sufficiently collapsed to stop an overmold resin from passing through the single filter media and into a filter cartridge filter cavity defined by the inlet and outlet during an overmolding process and a raised vent for removal of air between the inside surface of the inlet and the top of the top most filter media layer; an outlet having an outlet opening operatively positioned therein and being axially positioned opposite the inlet, the at least one porous filter media being operatively positioned there between; and a thermoplastic overmold, operatively injection molded over the periphery of the inlet, the outlet and the at least one porous filter media, sealing the periphery of the inlet, the outlet and the at least one porous filter media, thereby forming a substantially continuous leak-proof matrix of thermoplastic material permeated through the pores of the filter element.

Another presently preferred aspect of the present disclosure includes a plastic molded multi-media layer filter cartridge comprising: at least two porous filter media layers each having an outer periphery, an upper portion and a bottom portion; an inlet having a top and a bottom surface, at least one inlet opening operatively positioned therein, the inlet providing a connection for a user for operatively connecting the filter cartridge to a supply liquid and also providing support for the upper most porous filter media layer, a structural component operatively position proximate the outer periphery of the bottom surface of the inlet for operatively interacting with the upper portion of the upper most of the at least two filter media layers by increasing the compression on the top filter media layer to ensure that the pores of the upper most of the at least two filter media layers is sufficiently collapsed to stop an overmold resin from passing through the upper most of the at least two filter media layers and into a filter cartridge filter cavity defined by the inlet and outlet during an overmolding process and a raised vent for removal of air between the inside surface of the inlet and the top of the top most filter media layer; an outlet having an outlet opening operatively positioned therein and being axially positioned opposite the inlet, the at least two porous filter media layers being operatively positioned there between; at least one spacer seal having a top and bottom surface, operatively positioned between adjacent filter media layers wherein at least two filter media are operatively positioned between the inlet and the outlet; and a thermoplastic overmold, operatively injection molded over the periphery of the inlet, the outlet and the at least one porous filter media, sealing the periphery of the inlet, the outlet and the at least one porous filter media, thereby forming a substantially continuous leak-proof matrix of thermoplastic material permeated through the pores of the filter element.

Yet another presently preferred aspect of the present disclosure includes a method for manufacturing a filter cartridge comprising the acts of: providing at least one filter media layer having a top, a bottom and an outer periphery; providing an inlet having a top and a bottom surface and an outer periphery and at least one inlet opening operatively positioned therein, the inlet providing a connection for a user for operatively connecting the filter cartridge to a supply liquid, a vent port for venting air and also providing support for the upper most porous filter media layer, a structural component operatively positioned proximate the outer periphery of the bottom surface of the inlet for operatively interacting with the upper portion of the single filter media layer; providing an outlet having a top and a bottom surface and an outer periphery and at least one inlet opening operatively positioned therein; operatively positioning at least one filter media layer between the inlet and the outlet such that the outer periphery of the inlet, the outer periphery of the outlet and the outer periphery of the at least one filter media layer are substantially vertically aligned; applying pressure to the inlet and the outlet such that the structural component operatively interacts with the upper portion of the single filter media layer by increasing the compression on the top filter media layer to ensure that the pores of the single media layer is sufficiently collapsed to stop an overmold resin from passing through the single filter media and into a filter cartridge filter cavity defined by the inlet and outlet during an overmolding process; and injection molding a thermoplastic overmold over the periphery of each of the inlet, the outlet and the at least a portion of the top, the bottom and the outer periphery of the at least one filter media layer, wherein a temperature and pressure of the injection molded overmold causes the overmold to infuse the periphery of the at least one filter media layer.

Still another preferred aspect of the present disclosure includes a method for manufacturing a filter cartridge comprising the acts of: providing at least two filter media layers each having a top, a bottom and an outer periphery; providing an inlet having a top and a bottom surface and an outer periphery and at least one inlet opening operatively positioned therein, the inlet providing a connection for a user for operatively connecting the filter cartridge to a supply liquid, a vent port for venting air and also providing support for the upper most porous filter media layer, a structural component operatively positioned proximate the outer periphery of the bottom surface of the inlet for operatively interacting with the upper portion of the adjoining filter media layer; providing an outlet having a top and a bottom surface and an outer periphery and at least one inlet opening operatively positioned therein; providing at least one spacer seal having a top and bottom surface and an outer periphery; operatively positioning at least one spacer seal between the at least two filter media layers such that the adjoining surfaces thereof are substantially contacted by at least one spacer seal; operatively positioning the at least two filter media layers having the spacer seals operatively positioned therein between the inlet and the outlet such that the outer periphery of the inlet, the outer periphery of the outlet, the outer periphery of the at least two filter media layers and the outer periphery of the spacer seals are substantially vertically aligned; applying pressure to the inlet and the outlet such that the structural component operatively interacts with the upper portion of the contiguous filter media layer and the spacer seals interact with the contiguous filter media when the compression on the top filter media layer is increased to ensure that the pores of the at least two media layers are sufficiently collapsed to stop any overmold resin from passing through the single filter media and into a filter cartridge filter cavity defined by the inlet and outlet during an overmolding process; and injection molding a thermoplastic overmold over the periphery of each of the inlet, the outlet, the at least one spacer seal and at least a portion of the top, the bottom and the outer periphery of the at least two filter media layer, wherein a temperature and pressure of the injection molded overmold causes the overmold to infuse the periphery of the at least one filter media layer.

It is therefore one objective of the present disclosure to provide for the edge of multiple filter media layers to be compressed during the manufacture of a multi-filter media layer filter cartridge without cracking the upper most or any of the filter media layers during the manufacturing process.

It is therefore another objective of the present disclosure to provide for the reduction of the number of inlet configurations to a single configuration required to make a plurality of different filter cartridges having at least one filter media layer to and including at least two filter media layers operatively positioned therein.

DETAILED DESCRIPTION

Figure 1:
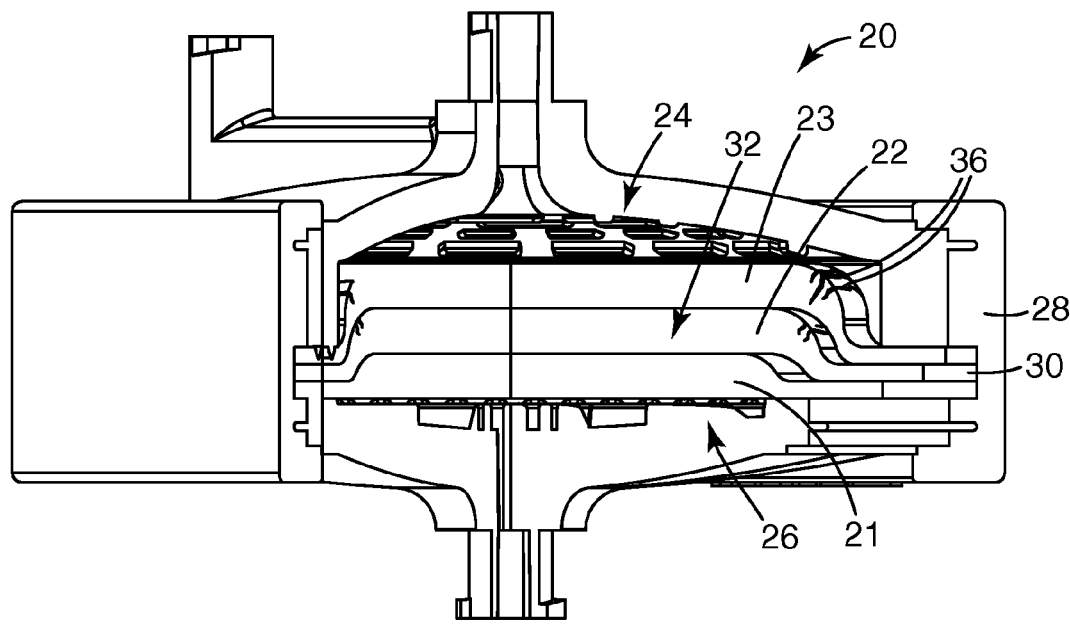
FIG. 1 is a partial cross-sectional view of a representative filter cartridge illustrating the media cracking problem encounter in the prior art.

The single filter media layer and the multi-filter media layered filter cartridges described herein and illustrated in the drawings are believed particularly suited for use in pharmaceutical and biopharmaceutical industry where they are used to filter bacteria, leukocytes, clots, particles, gases and other contaminants from solutions before being introduced into the human blood stream, although they may have other applications including, but not limited to, high purity water or solvents. The multi-filter media layer filter cartridges of the present disclosure is particularly suited for, but are not limited to, pharmaceutical, biopharmaceutical and industrial applications.

The description of the presently preferred representative embodiments of the present disclosure set forth hereinafter is made with reference to such single filter media layer and multi-filter media layer filter cartridges. However, it is to be understood that the disclosed method of manufacturing such single filter media layer and multi-filter media layer filter cartridges and the filter cartridges produced thereby may be used in other applications where the present disclosure's particular features may be found to be desirable. Thus, the present disclosure may be utilized to manufacture any type of plastic molded single filter media and multi-filter media layer filter cartridges wherein 100% sealing is desirable.

Referring now to FIGS. 2-3 and 5-6, presently preferred representative embodiments of the present disclosure are illustrated as a self contained capsule type filter cartridge assembly sized, presently preferably, to be about three inches in diameter, it being understood that other sized filter cartridge assemblies are also contemplated herein and which, is presently preferably used to filter a variety of liquids through multiple combinations of, presently preferably, Zetaplus® filter medias manufactured by CUNO®, a 3M® company and Zeta Carbon® filter media manufactured by CUNO®, a 3M® company.

Figure 2:
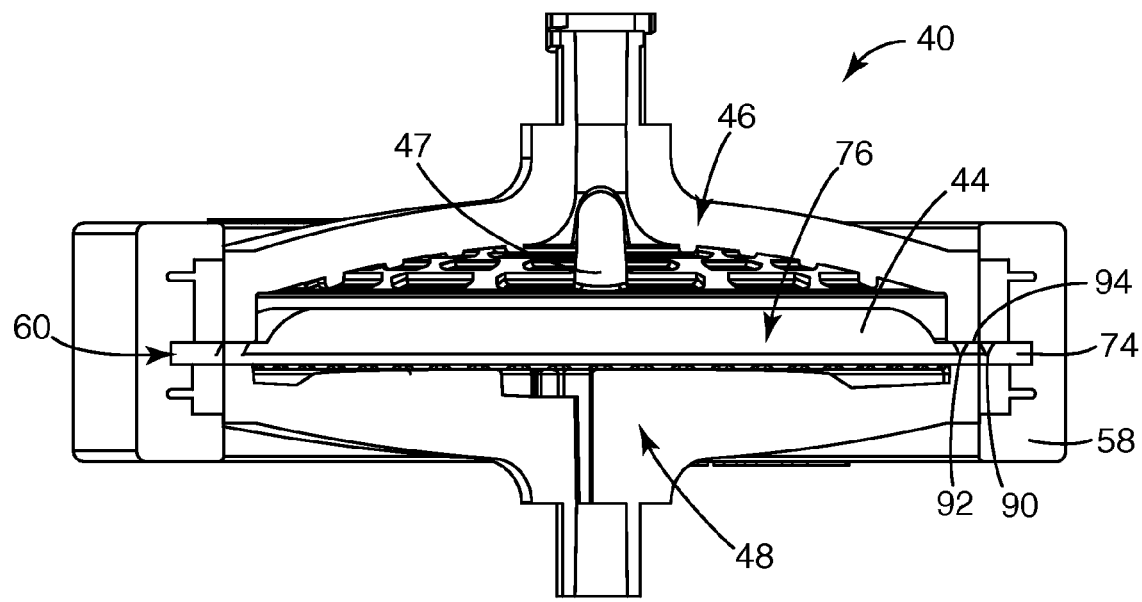
FIG. 2 is a partial cross-sectional view of a representative single filter media filter cartridge according to the present disclosure.
Figure 3:
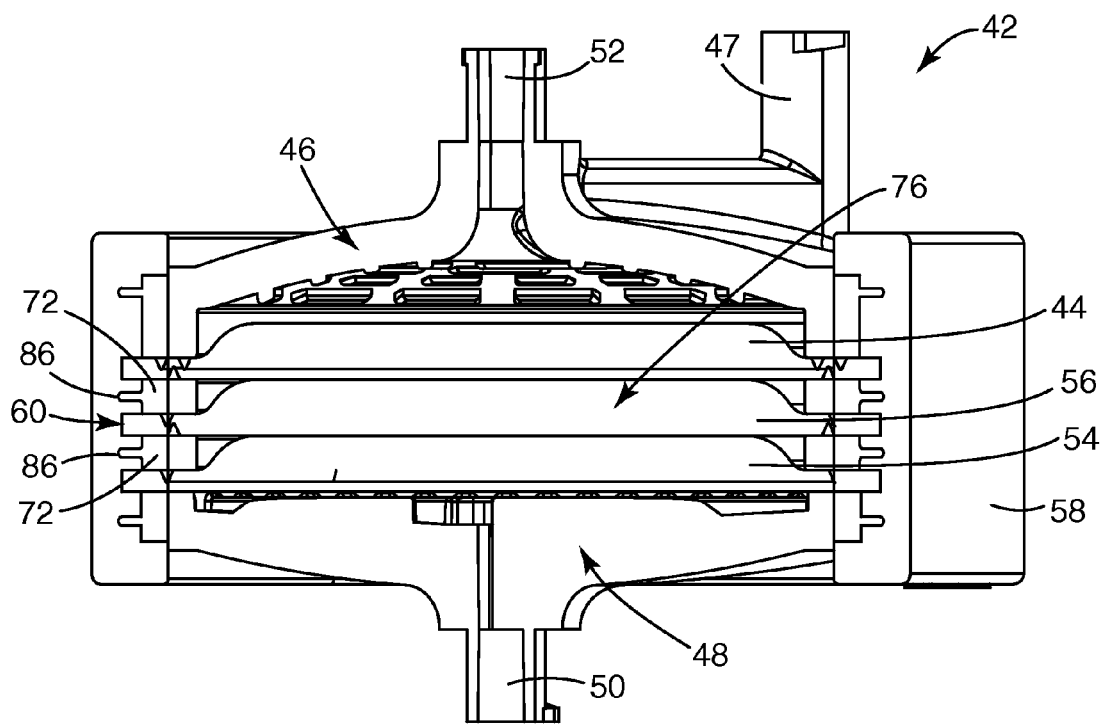
FIG. 3 is a partial cross-sectional view of a representative multi-filter media filter cartridge according to the present disclosure.
Figure 5:
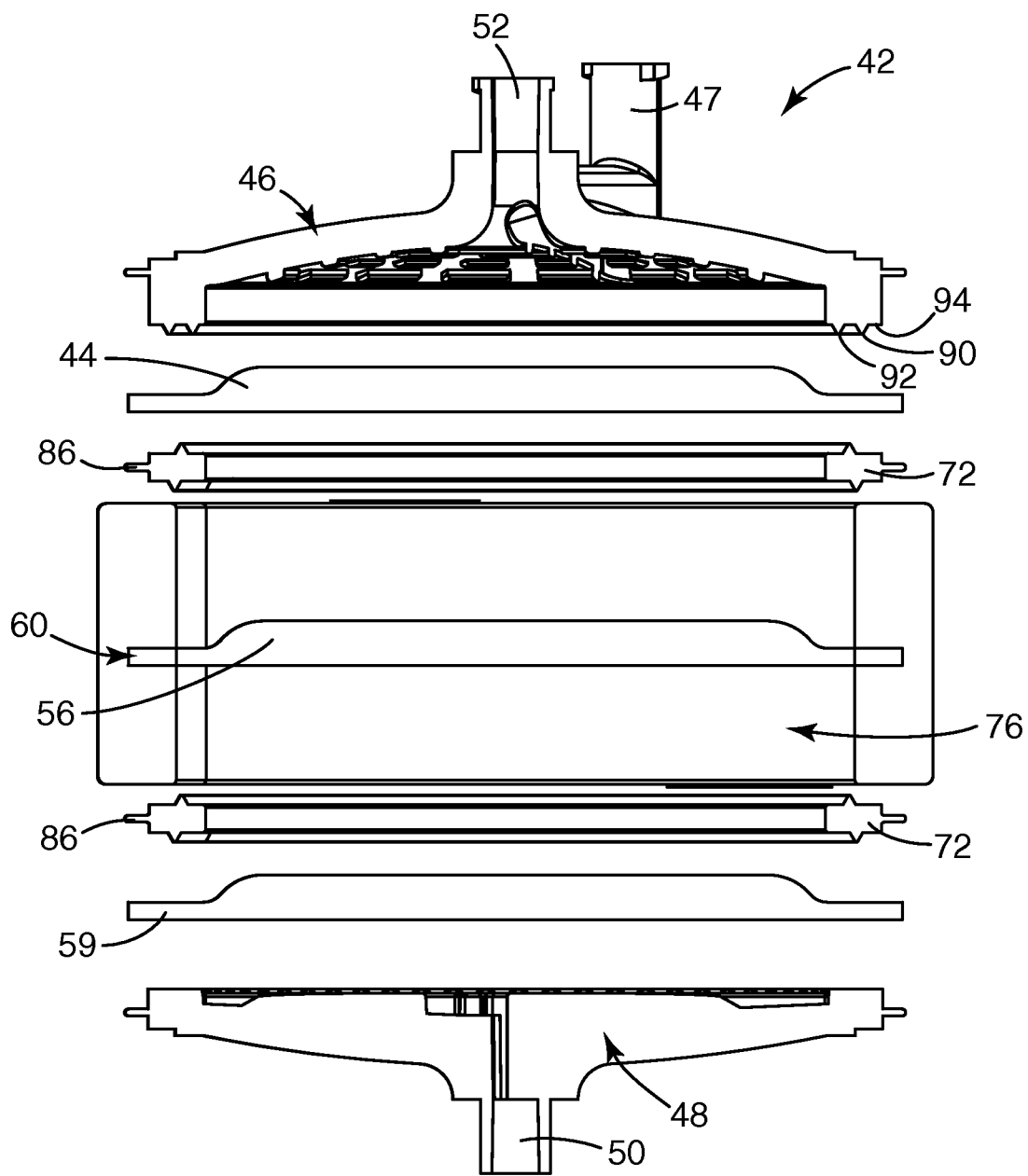
FIG. 5 is a partial cross-sectional exploded view of a representative multi-filter media filter cartridge according to the present disclosure.
Figure 6:
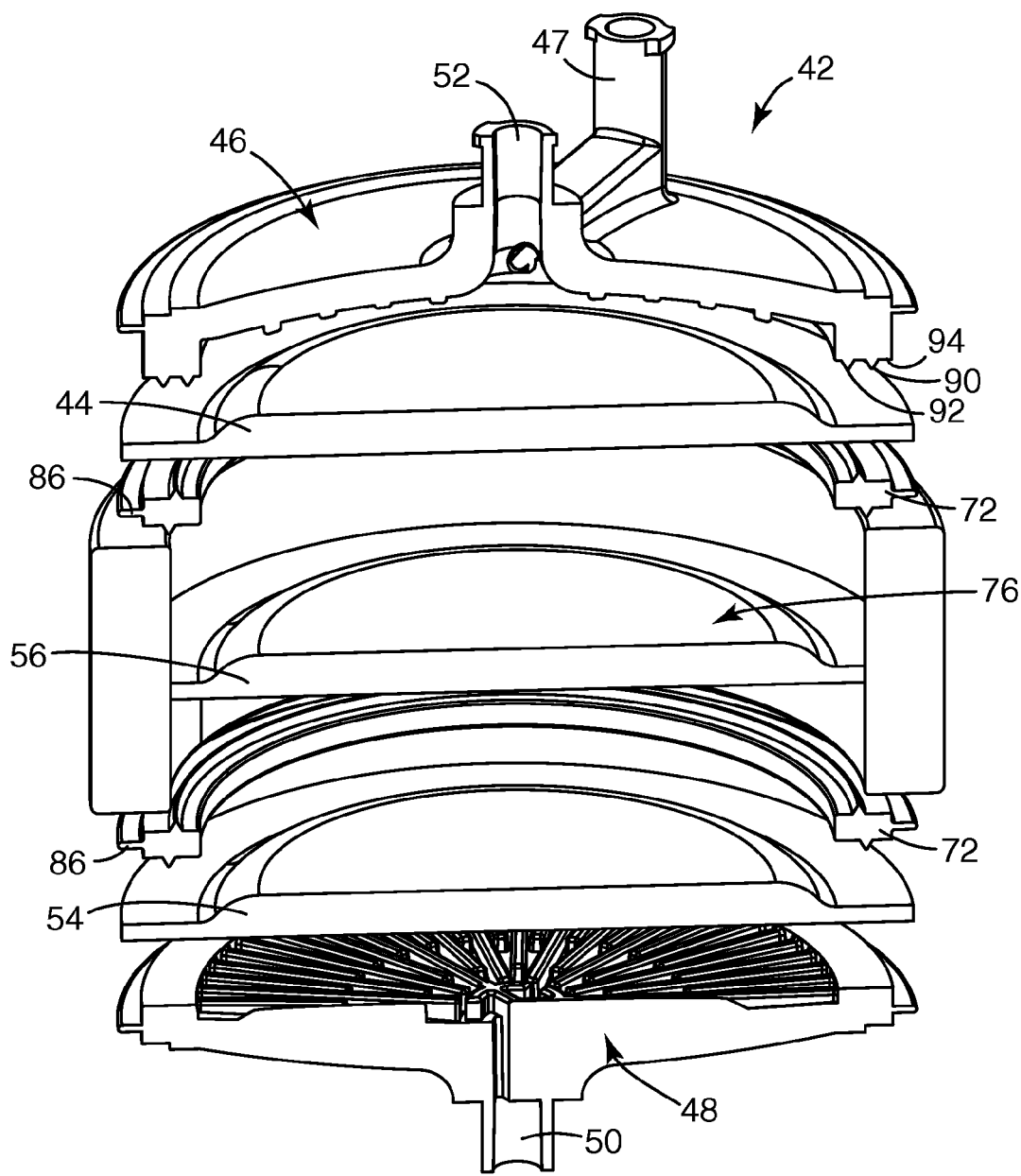
FIG. 6 is a partial cross-sectional, perspective, exploded view of a representative multi-filter media filter cartridge according to the present disclosure.

As illustrated in FIGS. 2-3 and 5-6, several, presently preferred representative, embodiments of the present disclosure are depicted. Specifically, FIG. 2 illustrates a single filter media layer filter cartridge 40 in accordance with the present disclosure, and FIGS. 3 and 5-6 illustrate a, presently preferred multi-filter media layer filter cartridge 42, in accordance with the present disclosure. Filter cartridges 40, 42 include at least one filter media layer 44 operatively disposed between an inlet 46, which provides a connection for the user to use to hook the filter up to the supply liquid and also provides support for the upper most filter media layer 44, and an outlet 48 having outlet and inlet openings 50 and 52, respectively, for the passage of fluid, which, provides a connection for the user to use to hook up to, in order to remove the filtered fluid from the filter cartridge and also provide support for the bottom most filter media layer 54. The filter media layer 44 and the inlet 46 and the outlet 48 are assembled and fused or bonded into an integral single filter media layer filter cartridge 40 and/or a multi-filter media layer filter cartridge 42 by means of an injection molded overmold band 58, the plastic that is molded over the stack of filter media layer 44, inlet 46, and outlet 48 of the filter cartridge, operatively positioned relative thereto by injection molding an overmold band 58 around the periphery 60 of the presently preferred representative single filter media layer filter cartridge 40 and of the presently preferred representative multi-filter media layer filter cartridges 42, as is known to those skilled in the art.

One innovative feature of the inlet 46 comprises a structural component 88 operatively position proximate the outer periphery of bottom surface 94 of the inlet and presently preferably comprises at least two ribs/knife edges 90, 92 for operatively interacting with the upper portion of the single filter media layer in both the representative single filter media layer filter cartridge 40 and the representative multi-filter media layer filter cartridges by increasing the compression on the first/top filter media layer to ensure that the pores of the filter media layer(s) are sufficiently collapsed to stop the overmold resin from passing through the filter media layer(s) and into the filter cartridge filter cavity 76 defined by the inlet 46 and outlet 48 during the overmolding process.

Another useful feature of the inlet 46, compared to other prior art is the incorporation of a raised vent 47. The vent 47 is used to vent out the air so that there will be no air bubbles on top of the filter media layers. This feature prevents any trapped air from restricting access to the filter media layer(s), thereby preventing the reduction of the effective surface area. Prior to the incorporation of the raised vent of the present disclosure, most prior depth filter capsules of a similar size not only did it not have a vent, but the ones that included a vent positioned the vent the same plane as the inlet hole. Since Air to escape needs to go to the highest point of the capsule, air would sometimes become trapped in these prior inlets, especially if the filter capsule was tilted, a position not favorable for effective air venting. In contrast, the vent design of the inlet of the present disclosure, positions the opening of the vent such that the vent is taller than the tallest part of the inside surface of the inlet. This design feature has been determined to more effectively provide for the removal of trapped air in the filter cartridge, even if filter cartridge is tilted, i.e. the filter media is positioned other than parallel with the surface of the earth. It is believed that the vent of the present disclosure will sufficiently vent the filter cartridge when the filter cartridge is positioned up to and including approximately a 25-degree angle off parallel. In the case where the vent is positioned at the highest point of tilt, the vent of the present disclosure is capable of sufficiently venting the air up to and including approximately an 85-degree angle off parallel.

The filter media(s) 44, 56, 54 may be constructed of any one of a number of materials and designs well known in the art. The pore size of the filter media(s) will be determined by the particular application in which the filter media(s) is to be used. The filter media(s) may include but is not limited to, for example, Zeta Plus® media or the like. The pore size of the filter media may range from, but not be limited to, about 0.1 to about 15 microns, however it should be understood that the pore sizes within and both above and below the representative range given may work in a particular application but may not work in others. Wide varieties of such filter media elements are available, and are well known to those skilled in the art.

The inlet 46 and the outlet 48 used in conjunctions with the filter media(s) are presently preferably made of thermoplastic material. The thermoplastic material used in the construction of the inlet 46 and the outlet 48 may be chosen from a wide variety of plastics, which are well known in the art, and may include but not be limited to plastics, such as, cellulose propionate, nylon, polyester, polypropylene, ABS, polyethylene, acrylic co-polymer and vinyl among others and variations thereof.

Figure 7:
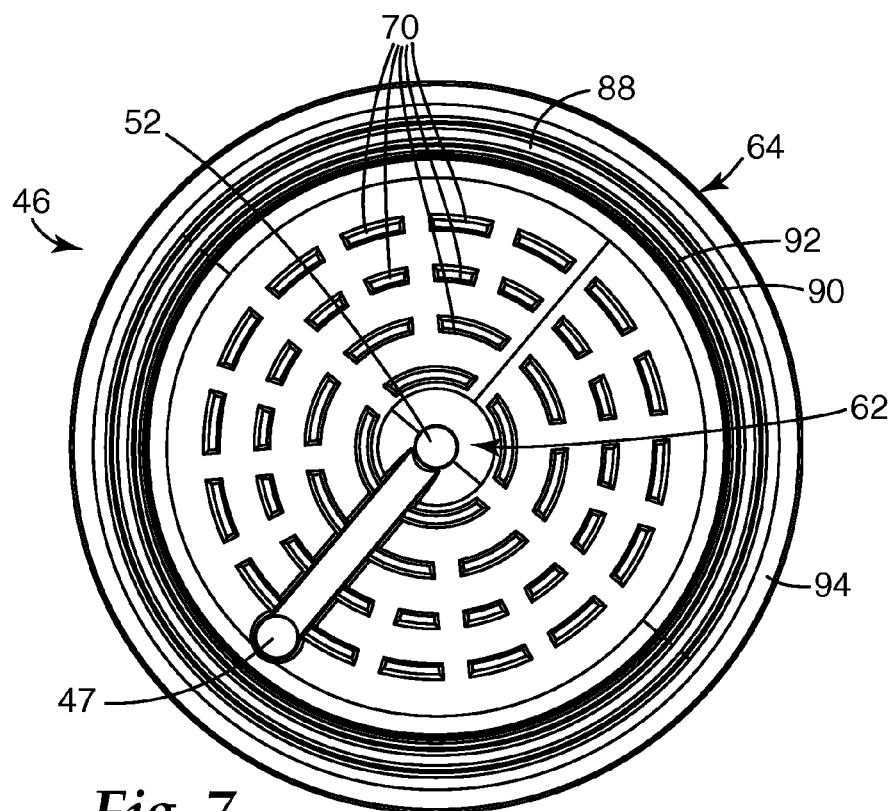
FIG. 7 is a plan view of the bottom of a representative inlet according to the present disclosure.
Figure 8:
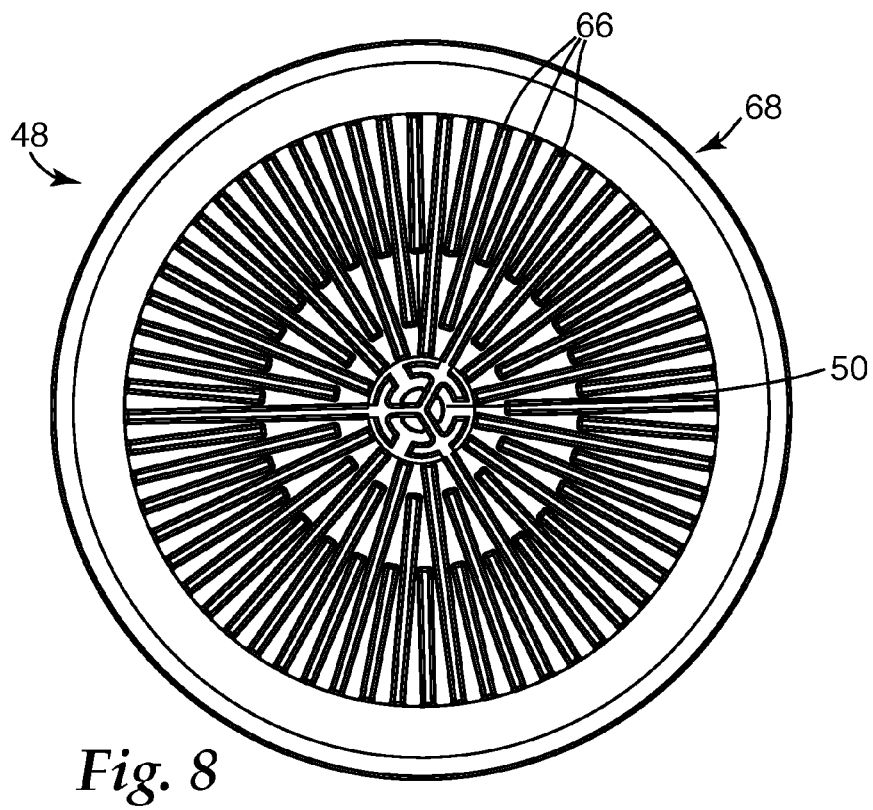
FIG. 8 is a partial plan view of the bottom of a representative outlet inlet according to the present disclosure.

As best illustrated in FIGS. 7 & 8, the inlet 46 has a central portion 62 surrounded by an outer portion 64. The inlet 46 and/or the outlet 48 may also include a plurality of radially extended ribs 66. In the presently preferred representative embodiment, the outlet 48 includes the radially extended ribs 66, which are disposed inwardly of the outer portion 68 of the outlet 48. The ribs 66 provide additional strength to the outlet 48, may also provide additional strength to the inlet 46, if used therein and may also act as a support for the filter media(s).

The inlet 46 may include similar strengthening ribs or may presently preferably include a plurality of concentric ribs 70 to provide for substantially even flow distribution as the fluid enters the filter cartridge, as would be know to those skilled in the art.

The injection molded overmold band 58, as shown in FIGS. 2-3 and 5-6, is generally made from a compatible thermoplastic material, usually the same thermoplastic material from which inlet 46 and outlet 48 are made. The overmold band 58 bonds with the inlet 46 and outlet 48 sealing the filter media(s) within, typically fusing with the inlet 46 and outlet 48 to form a single integral filter cartridge unit, such as filter cartridges 40, 42.

Referring now to FIGS. 3 and 5-6 illustrated therein is a presently preferred representative multi-filter media layer filter cartridge 42, in which the filter cartridge is sealed after operatively positioning at least one spacer seal 72 between adjacent filter media(s) wherein at least two filter media are operatively positioned between the inlet 46 and the outlet 48 in one presently preferred representative multi-filter media layer filter cartridges 42.

During the assembly of both the single filter media layer and the multi-filter media layer filter cartridges 40, 42, the inlet 46 and outlet 48 are aligned on opposite sides of a filter media(s) such that the outer portions 64 and 68, also referred to as the periphery, of the inlet 46 and outlet 48 oppose one another and centrally align with the filter media(s). During the manufacturing process, a force is then applied to the external surfaces of the inlet 46 and outlet 48 to cause the filter media(s) 44, 56, 54 to be compressed between the inlet 46 and the outlet 48.

With the filter media(s) aligned between the inlet 46 and outlet 48, thermoplastic melt is injection molded around the periphery 64 and 68 of the inlet 46 and outlet 48 to form the overmold band 58. The overmold band 58 completely surrounds the periphery 64 and 68 of the inlet 46 and outlet 48 to form an integral part of the single filter media layer cartridge 40 or the multi-filter media layer filter cartridge 42.

As illustrated in FIG. 2, a cross-sectional cut-away view of a single layer filter media filter cartridge 40, the filter media(s) 44 is completely encased within the thermoplastic inlet 46 and outlet 48. In this embodiment, the overmold thermoplastic melt has infused the edge 74 of the filter media(s) 44 sufficiently to seal the filter media(s) between the inlet 46 and outlet 48.

As illustrated in FIGS. 2-3 and 5-6, the filter media(s) 44, 56, 54 is positioned between the inlet 46 and outlet 48. The filter media(s) 44, 56, 54 is sized so that the edge 74 of a filter media(s) is disposed adjacent to the inlet 46 and the outlet 48, thereby enclosing the filter media(s) 44, 56, 54 within the filter cavity 76 defined by the inlet 46 and outlet 48.

Figure 4:
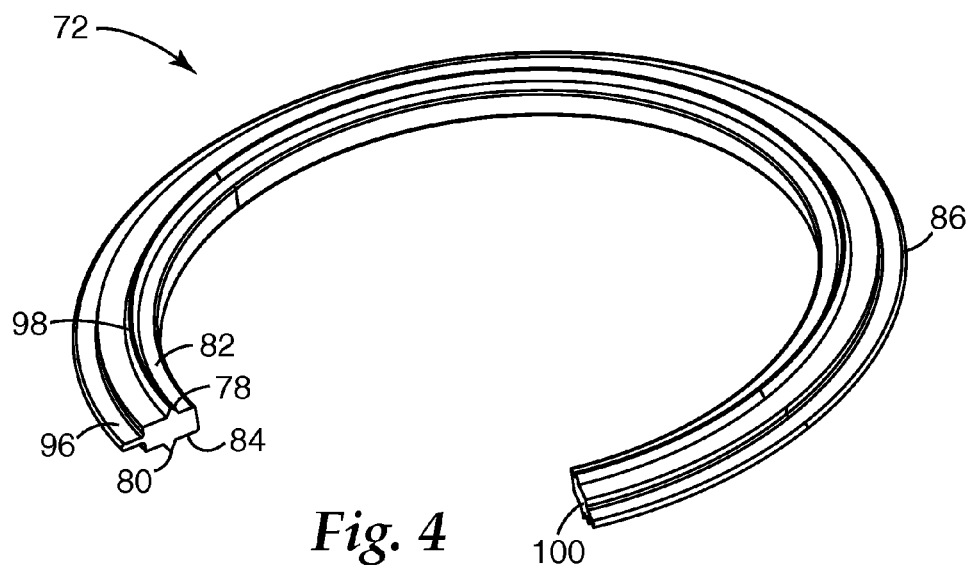
FIG. 4 is a partial cross-sectional perspective view of a representative spacer seal according to the present disclosure.

Referring now to FIGS. 3-6, during the manufacture of the multi-filter media layer filter cartridge 42, and specifically prior to the force being applied to the external surfaces of the inlet 46 and the outlet 48 to cause two or more filter media to be compressed there between, appropriate spacer seals 72, a presently preferred representative embodiment being illustrated in FIG. 4, are operatively positioned between the filter media layers 44, 56, 54, as illustrated in FIGS. 3, 5 and 6.

As would be understood by those skilled in the art, the size of the spacer seal 72 is selected relative to the filter media to be supported thereby, so it is possible that the spacer seal 72 could potentially change in geometry in order to perform the same function, if the filter media size (both diameter and thickness) should change. If a larger filter cartridge were to incorporate this concept into the manufacturer thereof, a larger spacer seal 72 would need to be utilized therewith, as would be readily understood by those skilled in the art.

The shape of the spacer seal is relative to the filter media shape, so it is possible that the spacer seal could potentially change in shape in order to perform the same function, if the filter media shape changes, e.g.; if a square or other shaped filter cartridge were required to be manufactured, a square spacer seal would also be required, as would be the case for other shapes.

As illustrated in FIGS. 3, and 5-6, the spacer seal(s) 72 is/are positioned between any two filter media layers prior to loading the subassembly into the injection molding equipment. The spacer seal(s) 72 is/are designed to be substantially equal to the difference between the thickness of an uncompressed filter media, and the thickness of the compressed edge of a filter media layer after completion of the overmolding step in the manufacturing process. The outside diameter of the spacer seal(s) is/are designed to be substantially equal to the filter media diameter and inside diameter of the spacer seal(s) is/are designed to be substantially equal to the inner diameter of the inlet. The spacer seal(s) is/are a wetted part, so the spacer seal(s) is/are presently preferably made from the same material or substantially the same material as the inlet and the outlet. However, one feature of the spacer seal is that it has been found to eliminate the need for additional headroom to be built into the inlet, as discussed in the background above, because the spacer seal adds the headroom volume only as additional headroom is needed. The seal ring is simpler to mold than multiple inlets.

FIG. 4 illustrates one possible representative, presently preferred spacer seal 72 configuration. As clearly illustrated in FIGS. 4-6, the spacer seal 72 of the filter cartridge of the present disclosure includes, presently preferably, triangular shaped ribs 78, 80, (or knife-edges) on the top 82 and bottom 84 surfaces of the spacer seal 72, respectively, and these ribs 78, 80 provide a localized increase in compression on the adjoining filter media layers during the compression of the inlet 46 and the outlet 48 during the manufacturing process. This increase in compression further ensures the pores operatively formed in the filter media are collapsed enough to stop any resin from the overmold from passing through the filter media and into the filter cavity 76 defined by the inlet 46 and outlet 48 during the overmolding process. The top rib 78, presently preferably, has a smaller diameter, i.e., is closer to the center of the spacer seal 72 than the bottom rib 80 and is offset (not opposing) from the bottom rib 80, the bottom rib 80 being more proximate the outer periphery 86 thereof. This configuration ensures that the filter media is not over compressed and/or cut by the opposing ribs/knife-edges 78, 80. The top rib 78 is designed to mate with the corresponding structural component 88, see FIG. 7, which consists of ribs/knife edges 90, 92 on the bottom surface 94 of the inlet 46.

The outer diameter rib 80 (of the spacer seal 72) is, presently preferably, incorporated to align the spacer seal 72 during the overmolding process without covering the entire face of the filter media layers. This particular orientation is believed to provide for a stronger bond between the resin of the over mold and filter media layers due to the increased surface area that the resin contacts on the outside periphery 60 of the filter media and spacer seal 72.

Finally, as illustrated in FIGS. 4-6, the spacer seal 72 configuration clearly illustrates two unique design features that have been incorporated into the representative filter cartridges 40, 42 of the present disclosure to improve the manufacturability of the finished filter cartridges. As mentioned above, when viewing a cross section of the spacer seal 72, there is a top surface 82 triangular shaped rib 78 (or "knife edge"), a bottom surface 84 triangular shaped rib 80 (or "knife edge") and a thin rib 96 (or "outer diameter rib") protruding outwardly away from the center of the spacer seal 72 substantially perpendicular to the triangular shaped ribs 78, 80.

As stated above, specifically, the knife edges 78, 80 provide a localized increase in compression on the filter media layer(s) 44, 56, 54 during the compression step of the manufacturing process. During the overmolding process of the manufacturing process, the cavity and core of the mold compress the filter cartridge assembly and the edge(s) 74 of the filter media layer(s) are compressed by the spacer seal(s) 72.

During the compression step, the addition of these knife edges 78, 80 to the configuration of the spacer seal 72 significantly increases the amount of compression at the outer diameter (tip) 98, 100 of each knife edge 78, 80. This increase in compression further ensures that the pores of the filter media layer(s) are sufficiently collapsed to stop the overmold resin from passing through the filter media(s) and into the filter cartridge filter cavity 76 defined by the inlet 46 and outlet 48 during the overmolding process.

As discussed above, it is presently preferred, as can be seen in the cross section of the spacer seal 72 in FIGS. 4-6, that the top knife edge 78 is offset from the bottom knife edge 80. Further, the top knife edge 78 has a smaller diameter than the bottom knife edge 80 in order to ensure that when one filter media layer is compressed between two spacer seals 72, the knife edge above a specific filter media layer and the knife edge below that same specific filter media layer do not line up, as clearly shown in FIGS. 5-6.

If the two spacer seal knife-edges 78, 80 were to substantially line up, it is anticipated that the filter media layer between the two specific knife-edges would be over compressed by the two opposing knife-edges and could potentially shear apart.

Without the knife-edges, it is anticipated that the tolerance of the mold clamping position (during the over molding process) would be very high and would increase the manufacturing scrap rate due to resin flowing into the center of the filter cartridge filter cavity 76 defined by the inlet 46 and outlet 48 through the porous filter media(s).

Specifically, the outer diameter rib 96 at the spacer seal 72 outer periphery 86 is incorporated such that the spacer seal 72 is aligned during the overmolding process without covering the entire face of the filter media layers. As illustrated in FIG. 5, the outer periphery 86 of this outer diameter rib 96 is substantially equal to the outside diameter of the filter media layers, the inlet 46 and the outlet 48 components.

During the overmolding process, all the components including, but not limited to the inlet and the outlet, the appropriate number of filter media layers and the appropriate number of spacer seals are assembled in a stack in proper order and placed in a mold (not shown), as would be understood by those skilled in the art. The mold has alignment pins operative to hold the stacked assembly concentric within the mold as the mold is closed and the compression of the filter media layers is initiated. Before the injection of resin that constitutes the overmold, the pins are retracted thus providing a totally encompassing overmolded edge spacer seal for the finished filter cartridge. During this process, the resin melt-bonds and mechanically bonds with all of the components in the stacked assembly held in the mold to ensure the finished filter cartridge has a sufficiently strong burst rating.

The outer diameter spacer seal ribs 96 are incorporated between filter media layers so that the surface area for resin bonding is increased vs. just extending the outside diameter of the spacer seal. The outer diameter spacer seal ribs 96 also allow the filter media layers to overhang the outside diameter of the outer diameter spacer seal ribs 96. This condition also increases the surface area of the filter media that is bonded to the overmolded resin. Without the corporation of the outer diameter spacer seal rib in the design, it is anticipated that the strength of the final filter cartridge would be reduced. This reduction of strength could reduce the operating pressure of the finished filter cartridge when in use. Since the overmold holds the filter cartridge together, if the resin bond and the mechanical bond strength of the overmold s reduced, the strength of the finished filter cartridge is reduced.

FIGS. 3, 5 and 6 illustrate the cross-section of the edge of the filter cartridge after the overmold band 58 has been injection molded around the periphery 64 and 68 of the inlet 46 and the outlet 48. The heat of the injected overmold thermoplastic melt has caused the surface of the periphery 64 and 68 to melt and fuse with the overmold band 58 forming an integral filter cartridge encasing the filter media(s).

Example One

During the development of our initial concept, two simulated mold pinch plates were created from aluminum, as would be routine for one skilled in the art and thus the details thereof are believed not to require a detailed description. The plates were designed such that when the two halves make contact, the gap between the two pinch points that would result is about 0.186 inches. This gap was determined to be the target pinch gap for three layers of filter media by multiplying one layer of filter media at 0.062 inches to ensure proper pore collapse during an injection molding process so that the resin used would not jet through the filter media, as would be understood by those skilled in the art. The simulated mold pinch plates were also designed to be able to house 90 mm disks of filter media. During the development of the present disclosure, the three layers of filter media were first placed on the bottom plate concentrically, and then the top plate was placed on top of the three layers of filter media also concentrically to form an assembly. This assembly was then placed on a hydraulic bearing press and pressed until the top and bottom plates touched on their outer edge as would be understood by those skilled in the art. After about 30 seconds of hold time, the press was released and the assembly was taken apart and the resulting compressed three layers of filter media were inspected for cracks. The above process was repeated for several grades of filter media.

FIG. 1 schematically illustrates the cracked filter media of the top layer as a result of this compression and a photograph (not shown) of the top layer of the resulting three layer filter media showed a combination of thick and fluffy filter media to tight and dense filter media forming a graded density, as would be understood by those skilled in the art. As illustrated in FIG. 1 and as shown in the photograph, the cracked filter media of the top layer as a result of this compression was clear. In fact, the cracking was very severe where the filter media separates and lifts from the rest of the filter media. This cracking would result in the test fluid to bypass through the first filter media layer and quickly plug the tighter second filter media layer.

The same process was repeated to verify the initial results and to confirm that the cracking occurred each time, as graphically illustrated in FIG. 1 and in photographs of the trial results available in laboratory notebooks (not shown).

Example Two

A second aluminum fixture, somewhat similar, to the above described fixture was then created in order to test the prototype of the filter cartridge of the present disclosure. Unlike the first fixture however, the compressing/pinching was created by using the prototype inlet, outlet and spacer seals. The aluminum fixture was machined and consisted of three individual parts. The top part was designed to exert the appropriate force in the desired locations on the inlet, a bottom part that would apply the appropriate force in the desired locations on the outlet, and a spacer part. The spacer part was designed such that, when all three aluminum parts were compressed using bolts, each filter media layer would be compressed to about 0.062 inches. In order to achieve this compression thickness for the spacer seal between the filter media layers and the thickness of the compressed gasket was also taken into consideration. The gasket was used as a means of sealing the two aluminum surfaces against one another in order to conduct fluid testing of the prototype The filter media that was used was die cut to about 2¾ inch diameter. The outlet was first placed in the bottom plate, and then a gasket was placed on top of the bottom plate. The filter media and spacer seals were placed into the spacer part and concentrically placed on top of the outlet and bottom plate combination where the gasket would be entrapped between the bottom plate and the spacer. A second gasket was then placed on top of the spacer so that there would be a gasket between the top plate and the spacer. Then, the inlet was placed on top followed by the top plate on top of the inlet. The 4 bolts were than fed through pre made holes of the three-part aluminum fixture and tightened.

The assembled fixture containing the prototype inlet, outlet and spacer seals were then tested by challenging with various combinations of contaminant. After the testing, the fixture was disassembled to check for any bypassing and cracking of the compressed filter media.

The examination of pictures of the results of both a three layer device and two layer filter media device, tested with a 250 ppm yellow green die and 10 g/L molasses solution combination, and Kool-aid® respectively showed no evidence of cracking.

In view of the above, it has now been established that innovative injection molded thermoplastic single filter media layer and multi-filter media layer filter cartridges that include a novel arrangement of structural features to improve both the quality of the manufacturing process and the integrity of the filter media layer seal and more particularly to a process for manufacturing both single filter media layer and multi-filter media layer filter cartridges and to the single filter media layer and the multi-filter media layer filter cartridges produced thereby and even more particularly to a process for manufacturing a multi-filter media layer filter cartridge without cracking the upper most filter media layer or any filter media layer during the compressing of at least two porous filter media layers between an inlet and an outlet while insuring an effective seal and the multi-filter media layer filter cartridges produced thereby and, yet, more particularly, to single filter media layer and the multi-filter media layer filter cartridges using only a single inlet design configuration and a single outlet design configuration for manufacturing a plurality of different single filter media layer filter cartridge configurations and a plurality of different multi-filter media layer filter cartridge configurations have been developed, It should be appreciated by those skilled in the art that the apparatus and methods of the present disclosure are capable of being incorporated in the form of a variety of embodiments, only a few of which have been illustrated and described above. The disclosure may be embodied in other forms without departing from its spirit or essential characteristics. The described embodiments are to be considered in all respects only as representative, illustrative and not restrictive, and the scope of the disclosure is, therefore, encompassed solely by the appended claims rather than by the foregoing description. All changes, which come within the meaning and range of equivalency of the claims, are to be embraced within their scope.

What is claimed is:

1. A filter cartridge comprising:
an inlet comprising an inlet opening, an inlet periphery, a top surface, and a bottom surface;
an outlet comprising an outlet opening, an outlet periphery, a top surface, and a bottom surface;
a first spacer seal, the first spacer seal comprising an outer periphery surface comprising an outer diameter rib;
the inlet and the outlet are both formed from a plastic, wherein the first spacer seal is made from the same material or substantially the same material that forms the inlet and outlet;
a filter media compressed between the bottom surface of the inlet and the top surface of the outlet, the filter media comprising a first filter media layer and a second filter media layer each comprising pores and an outer periphery, wherein the first spacer seal is positioned between the first filter media layer and the second filter media layer;
a filter cartridge cavity formed between the inlet and the outlet; and
a thermoplastic resin band molded over and bonded to the inlet periphery, the outlet periphery, the first spacer seal's outer diameter rib, and the outer periphery of each filter media layer, thereby forming a leak-proof matrix of thermoplastic material permeated through the pores along the outer periphery of the filter media layers.

2. The filter cartridge of claim 1 further comprising:
a second spacer seal, the second spacer seal comprising an outer periphery surface comprising an outer diameter rib;
wherein the second spacer seal is made from the same material or substantially the same material that forms the inlet and outlet;
the filter media comprising a third filter media layer, the third filter media layer comprising pores and an outer periphery;
wherein the second spacer seal is positioned between the second filter media layer and the third filter media layer;
wherein the thermoplastic resin band is molded over and bonded to the second spacer seal's outer diameter rib and to the third filter media layer, thereby forming a leak-proof matrix of thermoplastic material permeated through the pores along the outer periphery of the third filter media layer.

3. The filter cartridge of claim 1 wherein each spacer seal comprises a bottom surface comprising at least one spacer seal rib, wherein the spacer seal rib contacts the filter media layer proximate the bottom surface of the spacer seal to collapse the pores to prevent thermoplastic resin from passing through the filter media layer into the filter cartridge cavity.

4. The filter cartridge of claim 1 wherein each spacer seal comprises a top surface comprising at least one spacer seal rib, wherein the spacer seal rib contacts the filter media layer proximate the top surface of the spacer seal to collapse the pores to prevent thermoplastic resin from passing through the filter media layer into the filter cartridge cavity.

5. The filter cartridge of claim 3 wherein each spacer seal comprises a top surface comprising at least one spacer seal rib, wherein the spacer seal rib contacts the filter media layer proximate the top surface of the spacer seal to collapse the pores to prevent thermoplastic resin from passing through the filter media layer into the filter cartridge cavity, wherein the top surface spacer seal rib is radially offset from the bottom surface spacer seal rib.

6. The filter cartridge of claim 1 wherein the inlet comprises a vent to allow air to escape from the filter cartridge cavity.

7. The filter cartridge of claim 6 wherein the vent comprises a vent opening that is located higher than the uppermost portion of the filter cartridge cavity when the inlet is oriented upward.

8. The filter cartridge of claim 1 wherein the first spacer seal does not contact the bottom surface of the inlet.

9. The filter cartridge of claim 2 wherein the first spacer seal does not contact the second spacer seal.

10. The filter cartridge of claim 9 wherein the second spacer seal does not contact the top surface of the outlet.

11. A method of making the filter cartridge of claim 1, the method comprising:
forming a stack comprising:
at least two filter media layers stacked onto an outlet;
a spacer seal stacked between adjacent filter media layers having pores; and
an inlet stacked onto the at least two filter media layers;
compressing the stack in a mold to collapse the pores of the filter media layers between the inlet, outlet, and spacer seals;
injecting a molten thermoplastic resin into the mold such that the molten thermoplastic resin bonds with the inlet, the outlet, the filter media layers, and the spacer seals and permeates the pores of the filter media layers; and
cooling the molten thermoplastic resin to form a thermoplastic resin band around the stack.

12. The method of claim 11 wherein the stack comprises:
three filter media layers; and
two spacer seals.

13. The method of claim 11 further comprising:
forming a filter cartridge cavity between the inlet and the outlet;
wherein collapsing the pores of the filter media layers stops the molten thermoplastic resin from passing through the filter media layers to the filter cartridge cavity.

* * * * *

UNITED STATES PATENT AND TRADEMARK OFFICE
CERTIFICATE OF CORRECTION

| | |
|---|---|
| PATENT NO. | : 8,636,151 B2 |
| APPLICATION NO. | : 12/441162 |
| DATED | : January 28, 2014 |
| INVENTOR(S) | : Duval et al. |

Page 1 of 1

It is certified that error appears in the above-identified patent and that said Letters Patent is hereby corrected as shown below:

In the Specification

Column 10
Line 17, delete "know" and insert -- known --, therefor.

Column 14
Line 29, delete "prototype" and insert -- prototype. --, therefor.
Line 49, delete "10 g/Lmolasses" and insert -- 10 g/L molasses --, therefor.

Column 15
Line 6, delete "developed," and insert -- developed. --, therefor.

Signed and Sealed this
Third Day of June, 2014

Michelle K. Lee
*Deputy Director of the United States Patent and Trademark Office*